(12) United States Patent
Jakimov et al.

(10) Patent No.: US 9,040,116 B2
(45) Date of Patent: May 26, 2015

(54) METHOD AND DEVICE FOR COATING COMPONENTS

(75) Inventors: Andreas Jakimov, Munich (DE); Stefan Schneiderbanger, Bergkirchen (DE); Manuel Hertter, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/509,578

(22) PCT Filed: Nov. 11, 2010

(86) PCT No.: PCT/DE2010/001319
§ 371 (c)(1),
(2), (4) Date: May 11, 2012

(87) PCT Pub. No.: WO2011/057612
PCT Pub. Date: May 19, 2011

(65) Prior Publication Data
US 2012/0225213 A1    Sep. 6, 2012

(30) Foreign Application Priority Data
Nov. 12, 2009   (DE) .................... 10 2009 052 946

(51) Int. Cl.
| | |
|---|---|
| B05D 3/00 | (2006.01) |
| C23C 24/04 | (2006.01) |
| B05B 7/20 | (2006.01) |
| B05B 15/02 | (2006.01) |
| C04B 41/00 | (2006.01) |

(52) U.S. Cl.
CPC .............. *C23C 24/04* (2013.01); *B05B 15/025* (2013.01); *B05B 15/02* (2013.01); *C04B 41/009* (2013.01); *B05B 7/205* (2013.01)

(58) Field of Classification Search
None
See application file for complete search history.

(56) References Cited

U.S. PATENT DOCUMENTS

| | | | |
|---|---|---|---|
| 3,490,245 A | 1/1970 | Muenger et al. | |
| 4,860,685 A * | 8/1989 | Smith | 118/300 |
| 5,306,350 A * | 4/1994 | Hoy et al. | 134/22.14 |
| 2001/0042508 A1* | 11/2001 | Kay et al. | 118/697 |
| 2002/0100817 A1* | 8/2002 | Schroeder et al. | 239/112 |
| 2004/0016832 A1* | 1/2004 | Schroeder et al. | 239/690 |
| 2005/0103883 A1* | 5/2005 | Schroeder et al. | 239/104 |
| 2007/0036905 A1 | 2/2007 | Kramer | |
| 2010/0151124 A1* | 6/2010 | Xue et al. | 427/185 |

FOREIGN PATENT DOCUMENTS

| | | |
|---|---|---|
| DE | 1 601 247 A1 | 5/1970 |
| DE | 27 34 920 A1 | 2/1979 |
| DE | 102 24 777 A1 | 12/2003 |

(Continued)

OTHER PUBLICATIONS

PCT/DE2010/001319 PCT/ISA/210, dated Feb. 16, 2011, 3 pages.

(Continued)

*Primary Examiner* — Timothy Meeks
*Assistant Examiner* — Michael P Rodriguez
(74) *Attorney, Agent, or Firm* — Crowell & Moring LLP

(57) ABSTRACT

A method for spraying a coating and a cold gas spray nozzle is disclosed. The method includes spraying a coating by the cold gas spray nozzle. A rinsing gas is fed to the cold gas spray nozzle during an interruption of the spraying or at an end of the spraying. Deposits in the cold gas spray nozzle are cooled and detached by the rinsing gas.

7 Claims, 1 Drawing Sheet

(56) References Cited

FOREIGN PATENT DOCUMENTS

| | | |
|---|---|---|
| DE | 102005000707 A1 * | 7/2006 |
| DE | 10 2005 045 241 A1 | 3/2007 |
| DE | 10 2007 031 602 A1 | 1/2009 |
| DE | 10 2007 032 021 A1 | 1/2009 |
| DE | 10 2007 032 022 A1 | 1/2009 |
| EP | 1 630 253 A1 | 3/2006 |
| EP | 1 674 594 A1 | 6/2006 |
| EP | 1 806 429 A1 | 7/2007 |
| EP | 1 854 547 A1 | 11/2007 |
| JP | 2009192810 A * | 8/2009 |

OTHER PUBLICATIONS

German Search Report, dated Jun. 21, 2010, 4 pages total.

* cited by examiner

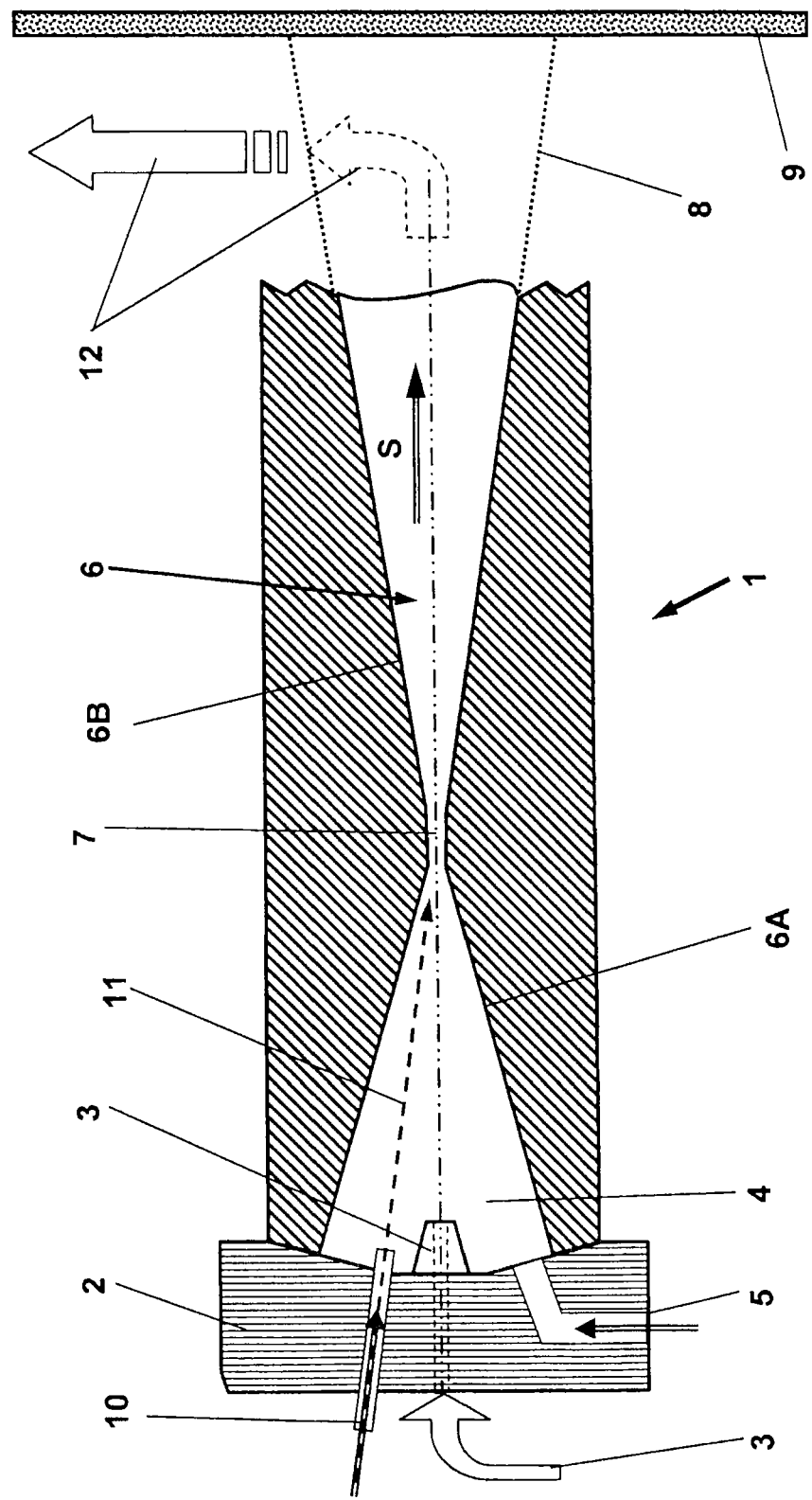

METHOD AND DEVICE FOR COATING COMPONENTS

This application claims the priority of International Application No. PCT/DE2010/001319, filed Nov. 11, 2010, and German Patent Document No. 10 2009 052 946.2, filed Nov. 12, 2009, the disclosures of which are expressly incorporated by reference herein.

BACKGROUND AND SUMMARY OF THE INVENTION

The invention relates to a method for producing a protective coating by means of a cold gas spray nozzle and a cold gas spray nozzle.

Coating components such as gas turbine components on their surfaces with wear-resistant coatings is known from the prior art. These types of wear-resistant coatings are for example anti-erosion coatings, oxidation protection coatings as well as anti-corrosive coatings. Hot-gas anti-corrosive coatings are especially important in the case of gas turbine components.

A method for producing a protective coating is known from German Patent Document No. DE 10 2005 045 241 A1. In this case, a component to be coated, e.g., a turbine component, is coated with a powdery coating material, which is mixed with a propellant. Coating and heat treatment of the coated component take place at a process temperature below or above the decomposition temperature of the propellant in order to produce a porous protective coating, which is thereafter cooled.

To produce the hot-gas anti-corrosive coating, coating takes place in many cases by means of a cold coating process, preferably with a cold kinetic compaction process, which is also called "K3 Process" in German, or cold gas spraying.

In the case of cold gas spraying, a powdery coating material is applied to the substrate at a very high speed. To do so, the powder particles are introduced into a gas beam from a preheated process gas, wherein the gas beam was accelerated beforehand to supersonic speed by expansion in a spray nozzle, formed most of the time as a type of Laval nozzle. The powder particles are accelerated to such a high speed by injection into the gas beam that, in contrast to other thermal spraying methods, they form a dense and permanently adhering layer on the substrate even without melting or beginning to melt during impact.

A method for processing the surface of a component of an aircraft engine is known from German Patent Document No. DE 10 2007 031 602 A1. This method provides preparing for processing the component; first of all, the surface thereof is roughened or activated by irradiating, by means of a cold gas spraying device and with the use of a powder that has ceramic components. Afterwards, the pretreated surface is also coated with the cited cold gas spraying device.

The spray nozzles for use for this method for cold gas spraying may be produced of metal, metal alloys, light metal such as aluminum, or hard material such as tungsten carbide. Full nozzles as well as divided nozzles, such as nozzles put together, for instance, of half shells, are known.

It is known that particles accumulate in the interior of the spray nozzle during the spraying process, in particular at the narrowest nozzle cross section. As a result, the nozzle cross section is narrowed even further. As things now stand, the nozzles then must be laboriously blasted free, for example, with Al2O3 particles.

To this end, a cold gas spray nozzle is known from German Patent Document No. DE 10 2007 032 021 A1, which is used to accelerate gas and spray particles during coating. The cold gas spray nozzle is supposed to be protected from adhesions. To do so, a heat-resistance plastic is provided in the region of the smallest diameter, i.e., in the transition from a section converging in the flow direction in a diverging section. The clogging of the cold gas spray nozzle with spray particles is supposed to be reliably prevented in that the heat-resistant plastic is made of polyetherketones (PEK), polyimide (PI), polytetrafluoroethylene (PTFE), fiber-reinforced plastic, or is configured as MICA.

Finally, another cold gas spray nozzle is known from German Patent Document No. DE 10 2007 032 022 A1, which can also be produced simply and inexpensively and in which there is no turbulence in the gas stream. Therefore, the smallest diameter of the converging section is supposed to deviate from the smallest diameter of the diverging section. The smallest diameter of the converging section is preferably smaller than the smallest diameter of the diverging section of the nozzle. Therefore, a step from the smallest diameter to the larger diameter of the widening nozzle part is formed in the transition of the nozzle in the direction of the diverging section so that adhesions of the spray material are supposed to be securely prevented here.

The cited measures for keeping the cold gas spray nozzle clean, on the one hand, increase the expense for producing the spray nozzles and, on the other hand, contribute to increased wear of the spray nozzles. This is to be expected in that the most sensitive point of the nozzle contour, namely the narrowest cross section, is made of a relatively soft material, or that an edge that is prone to wear is supposed to be arranged there.

Therefore, the object of the invention is to create a novel method and a corresponding nozzle arrangement for use in the cold gas spraying method, in which a cleaning of a cold gas spray nozzle is possible in a simple and cost-effective manner.

According to the invention, method includes, in addition to the known process steps of cold gas spraying, at least the steps of an interruption of the spraying process, the introduction of a cold or cooled rinsing gas into the spray nozzle and the continuation of the spraying process. The introduction of the rinsing gas during one or all breaks is preferably carried out between successive spraying processes. A cooled carrier gas of the spraying process or a cold inert gas is used as the rinsing gas. Therefore, liquid $CO_2$ may be used as the rinsing gas.

The rinsing process may take place suddenly or as a function of a temperature measurement at the spray nozzle.

The rinsing of the spray nozzles with the rinsing gas may take place starting from the feed of the carrier gas. Separate gas supply lines may also be provided for the rinsing gas. The rinsing may be carried out in a flat manner over the entire nozzle structure or in a targeted manner for one or individual selected regions.

The feeding of the rinsing gas to a spray nozzle may be controlled with respect to a pressure and/or a volume in order to optimize the cooling effect of the particles of the spray powder adhering to the inner surface of the spray nozzle and at the same time achieve the best possible cleaning effect for the particles detached by the cooling.

The control of rinsing may be adjusted as a function of the status of a spraying process, the operating duration of a spraying process and the type of spray material processed.

Rinsing the spray nozzles makes it possible for the warm particles of deposits in the spray nozzle contour to cool as quickly as possible and therefore experience a change in their dimension as compared to the spray nozzle contour. The deposits detach in this way from the inner contour of the spray nozzle. A rinsing stream may then blow the loose particles out of the spray nozzle.

A device according to the invention includes, in addition to the feed of carrier gas and spray powder, a feed of rinsing gas.

The feed for cold or cooled rinsing gas may be arranged separately next to the carrier gas feed.

The feeding of rinsing gas may also take place through the carrier gas feed. Then a cooling of the carrier gas may take place before the entry to the spray nozzle by means of a suitable device.

The feeding of rinsing gas may also take place in connection with a device for powder feed.

Additional advantageous applications and embodiments are disclosed in the dependent claims.

The invention will be explained by the following example on the basis of a graphic representation.

BRIEF DESCRIPTION OF THE DRAWING

The figure shows a schematic representation of a spray nozzle having a device according to the invention for feeding rinsing gas.

DETAILED DESCRIPTION OF THE DRAWING

The FIGURE shows a cold gas spray nozzle 1 that is provided for accelerating carrier gas and spray powder or spray particles. The cold spray nozzle 1 is provided with a screen 2 covering the inlet side, in which a powder feed 3 is arranged. With the left half of the cold spray nozzle, the screen 2 forms a feed chamber 4 for the carrier gas. The carrier gas is guided into the feed chamber 4 by means of a carrier gas connection 5 with adjustable pressure and adjustable temperature. The carrier gas may also be guided into the feed chamber 4 of the cold gas spray nozzle 1 in connection with the powder feed 3.

All together, the cold spray nozzle 1 has one flow channel 6, which on both sides shows contours running conically to a narrowest cross section 7 in the center. Thus, the flow channel 6 merges at its narrowest cross section 7 from a section 6A narrowing in flow direction S out of the feed chamber 4 into a section 6B expanding in flow direction S.

After the blending of the spray particles or of the spray powder with the carrier gas in the feed chamber 4, the gas/particle mixture is then compressed in the narrowing section 6A and pressed through the narrowest cross section 7. Here, the mixture and therefore also the spray particles are accelerated at a high speed. The accelerated spray particles are further accelerated with the expansion in the widening section 6B and then through a nozzle exit in a spray stream 8 onto a substrate 9 to be coated. They adhere there due to their high kinetic energy and are compressed into a compact coating.

In order to prevent the attachment of spray particles at the narrowest cross section 7 of the cold gas spray nozzle 1 or even a clogging of the cold spray nozzle 1 with spray particles, the cold gas spray nozzle 1 is equipped with a device for the targeted feeding of cold or cooled rinsing gas. This device is particularly advantageous when using hard materials, such as those that are used for the coating of turbine blades.

To this end, a rinsing gas nozzle 10 is arranged in the screen 2 as the FIGURE shows. The rinsing gas nozzle 10 is directed at the narrowest cross section 7 of the cold spray nozzle 1 in the flow channel thereof. In this case, the rinsing gas nozzle may also be arranged in connection with the powder feed 3.

The temperature of the carrier gas fed into the cold gas spray nozzle 1 may be selected to be as high as desired, because the carrier gas is suddenly cooled at the narrowest cross section 7 of the cold gas spray nozzle 1 during the expansion of the carrier gas. If the cold gas spray nozzle 1 is fed with hot carrier gas that is 600 degrees Celsius, the gas temperature at the widening side of the cold gas spray nozzle may be less than 300 degrees Celsius.

On the other hand, the gas speed within the cold gas spray nozzle 1 depends on the temperature of the carrier gas fed into the cold gas spray nozzle 1. Thus, it may be especially advantageous, if the cold gas spray nozzle 1 can be fed with a carrier gas, which has a temperature of over 500 degrees Celsius, in particular of over 800 degrees Celsius, and, if applicable, of over 1200 degrees Celsius. Higher gas speeds may be achieved in this way. Correspondingly higher particle speeds are reached with this, whereby especially in the coating of turbine blades, a substantially better efficiency is achieved and much more resistant layers are formed.

A temperature level that is produced in this manner in the operating state of the cold gas spray nozzle 1 makes an especially efficient use of the method according to the invention possible, over wide operating ranges.

The method according to the invention may be used as follows.

The known process steps of cold gas spraying include the feeding of carrier gas at a pre-selected or adjustable pressure and a pre-selected or adjustable temperature into the feed chamber 4 of the cold gas spray nozzle 1. Moreover, a spray powder or a stream of spray particles corresponding to the coating is fed into the feed chamber 4. As a result, the spray powder or the spray particles may be accelerated by means of the carrier gas through the cold gas spray nozzle 1 and applied to the substrate such that a cold kinetic solidified (compacted) layer is able to form.

In order to avoid a reduction in performance or quality of the function of the cold spray nozzle 1, it is furthermore provided for the method that a cold or cooled rinsing gas is introduced into the cold spray nozzle during an interruption or at the end of a spraying process. In this case, powder parts or spray particles adhering to the narrowest cross section 7 of the cold gas spray nozzle 1 are cooled so that they detach from the surface of the cold spray nozzle 1.

Afterwards, the rinsing gas stream discharges the detached powder parts or spray particles from the cold gas spray nozzle 1 simultaneously.

In order to safeguard the process conditions and the cleanliness of the process chamber, the rinsing gas stream is extracted by suction. A mechanical diverting of the rinsing gas stream at the exit of the cold gas spray nozzle 1 is also possible so that the powder parts or spray particles removed from the cold gas spray nozzle 1 are not able to reach a substrate or contaminate the process chamber.

After interruption of the spraying process and the introduction of the cold or cooled rinsing gas into the cold gas spray nozzle 1, the continuation or ending of the respective spraying process may be provided.

A cooled carrier gas may be used as the rinsing gas such as it is also used for the spraying process. Moreover, a cold or cooled inert gas, such as liquid $CO_2$ for instance, may also be used as the rinsing gas.

If the rinsing gas is supposed to be fed in a cold state, a cooling device for the rinsing gas reservoir must be provided.

Furthermore, the rinsing gas may also be cooled, just directly, before introduction into the cold gas spray nozzle 1 so that only the quantity of gas that is respectively used must be cooled. The latter alternative is also suitable for the use of carrier gas that is introduced into the cold gas spraying process. This carrier gas is then not preheated but cooled before introduction into the cold gas spray nozzle 1.

The introduction of the rinsing gas, however, is preferably carried out during at least one or all of the breaks between successive spraying process steps.

The rinsing process with cold rinsing gas takes place such that there is a sudden temperature drop at the powder parts or spray particles adhering to the cold gas spray nozzle 1. In this case, the detachment process is supposed to take place rapidly, and at the same time the cold gas spray nozzle 1 that is warm and thick-walled, as compared to the deposits, is supposed to be cooled as little as possible in order to avoid damage. To this end, the quantity and temperature of the rinsing gas is pre-selectable and may be coordinated with the spraying process and/or the material being used as well as with the material of the cold gas spray nozzle 1 (temperature sensitivity).

The rinsing process itself may take place suddenly to reduce downtimes so that there is a sudden temperature drop at the powder parts or spray particles adhering to the cold gas spray nozzle 1. Then the detachment process will take place quickly.

Based on experience, the cooling may take place, by means of rinsing gas and also as a function of a temperature measurement at the spray nozzle. Then the rinsing gas is cooled so far or fed until a specific material temperature coordinated with the spray material used has been reached at the narrowest cross section 7 of the cold gas spray nozzle 1, and the powder parts or spray particles reliably flake off, wherein the cold gas spray nozzle 1 is cooled as little as possible and therefore cannot be damaged.

Basically, the rinsing gas is introduced into the cold gas spray nozzle 1 in a controlled manner with respect to a quantity and a temperature. The quantity and temperature are selected in such a way that a rapid cooling of the deposits takes place with the least possible cooling of the cold gas spray nozzle 1.

The feeding of the rinsing gas to the cold gas spray nozzle 1 may be controlled in this case, with respect to the pressure and/or the volume and the temperature of the rinsing gas to be pushed through, in order to maximize the cooling effect of the particles of the spray powder adhering to the inner surface of the cold gas spray nozzle 1 and at the same time achieve the best possible cleaning effect for the particles detached by the cooling. Thus, somewhat at the beginning of the rinsing gas feed, a large volume flow of rinsing gas may be introduced for rapid cooling. Afterwards, the removal of the detached particles may be supported by an increase in pressure.

The control of the process of rinsing with rinsing gas may take place as a function of the status of a spraying process.

In this connection, a rinsing process may be initiated as a function of the operating duration of the system or during an individual spraying process. In doing so, the continuity of the coating will, of course, be taken into consideration.

In addition, the rinsing may be adjusted as a function of the type of spray material processed. In this case, how the tendency of certain spray materials to adhere in the cold gas spray nozzle 1 shown must be taken into account. Consideration may also be given thereby to the material pairing between the nozzle material and the spray material.

As the FIGURE shows, a separate line may also be provided as a rinsing gas feed or a rinsing gas nozzle 10 for the rinsing gas. The rinsing gas nozzle 10 produces a rinsing gas stream 11, which is directed at the narrowest cross section 7 of the cold gas spray nozzle 1.

The rinsing with rinsing gas may be directed in a flat manner over the entire nozzle structure by means of the carrier gas feed (carrier gas connection 5). A cooling of the carrier gas is required here as mentioned above. This may advantageously be directly upstream from the cold gas spray nozzle 1.

However, the embodiment according to the FIGURE shows a rinsing gas feed aligned in a targeted manner for one or individual selected regions in the rinsing gas stream 11 via the rinsing gas nozzle 10.

Rinsing the cold gas spray nozzles 1 thus makes it possible for the warm particles of the deposits in the contour of the cold gas spray nozzle 1 to cool as rapidly as possible and thereby experience a change in their dimension. The deposits break up through the deformation and are separated from the inner contour (section 6A, narrowest cross section 7, section 6B) of the cold gas spray nozzle 1.

The loose particles may then be blown out of the cold gas spray nozzle 1 by means of the rinsing stream 11.

Finally, an extraction device 12 may be provided at the exit of the cold gas spray nozzle 1, by means of which the particles to be viewed as contamination may be conveyed away from the substrate or out of the process chamber.

To keep the contaminated particles away from the substrate or out of the process chamber, a mechanical diverting device may also be arranged, which, during rinsing, is positioned in front of the exit of cold gas spray nozzle 1 and in the process is able to laterally divert the exiting rinsing gas stream, including contaminated particles conveyed with the rinsing gas.

The invention claimed is:

1. A method for spraying a coating, comprising the steps of:
   spraying a coating by a cold gas spray nozzle;
   feeding liquid $CO_2$ into and through the cold gas spray nozzle during an interruption of the spraying or at an end of the spraying; and
   cooling and detaching deposits from an inner surface of the cold gas spray nozzle by the liquid $CO_2$.

2. The method according to claim 1, further comprising the step of feeding the liquid $CO_2$ into and through the cold gas spray nozzle between successive spraying processes.

3. The method according to claim 1, further comprising the step of controlling the feeding of the liquid $CO_2$ to the cold gas spray nozzle based on a volume and/or a temperature of the liquid $CO_2$.

4. The method according to claim 1, further comprising the step of adjusting the feeding of the liquid $CO_2$ to the cold gas spray nozzle as a function of a status of the spraying and/or an operating duration of the spraying and/or a type of coating material.

5. The method according to claim 1, wherein the step of feeding the liquid $CO_2$ to the cold gas spray nozzle includes the steps of feeding a large volume of the liquid $CO_2$ to the cold gas spray nozzle at a beginning of the feeding followed by increasing a pressure of the liquid $CO_2$ at an ending of the feeding.

6. The method according to claim 1, further comprising the step of laterally diverting the liquid $CO_2$ and detached deposits exiting from the cold gas spray nozzle by a mechanical diverting device positioned in front of an exit of the cold gas spray nozzle.

7. The method according to claim 1, further comprising the step of extracting the liquid $CO_2$ from the cold gas spray nozzle by suction.

* * * * *